United States Patent [19]
Meikrantz et al.

[11] Patent Number: 5,571,070
[45] Date of Patent: Nov. 5, 1996

[54] ROTOR SLEEVE FOR A CENTRIFUGAL SEPARATOR

[75] Inventors: David H. Meikrantz; Alfred G. Federici; Lawrence L. Macaluso; Peter J. Harris, all of Carson City; H. William Sams, III, Reno, all of Nev.

[73] Assignee: Costner Industries Nevada, Inc., Carson City, Nev.

[21] Appl. No.: 586,964

[22] Filed: Jan. 16, 1996

[51] Int. Cl.$^6$ .............................. B04B 5/06; B04B 11/00
[52] U.S. Cl. .............................. 494/22; 494/41; 494/63; 494/65; 366/305
[58] Field of Search ................................ 494/22, 31, 34, 494/43, 44, 60, 63, 65, 901, 85; 210/799; 366/305, 306

[56] References Cited

U.S. PATENT DOCUMENTS

| | | | |
|---|---|---|---|
| 2,474,006 | 6/1949 | Maycock | 366/305 X |
| 2,474,007 | 6/1949 | Maycock | 366/305 X |
| 3,424,312 | 1/1969 | Nyrop et al. | |
| 3,674,196 | 7/1972 | Gutter | 494/22 X |
| 4,786,480 | 11/1988 | Martin | 494/44 X |
| 4,816,152 | 3/1989 | Kalleberg | |
| 4,824,430 | 4/1989 | Kashihara et al. | 494/22 |
| 4,857,040 | 8/1989 | Kashihara et al. | 494/22 |
| 4,959,158 | 9/1990 | Meikrantz | 366/305 X |
| 5,024,647 | 6/1991 | Jubin et al. | 494/43 X |
| 5,149,432 | 9/1992 | Lavin | |
| 5,254,075 | 10/1993 | Nemoto et al. | 494/65 X |
| 5,254,076 | 10/1993 | Chow et al. | 494/63 X |
| 5,267,936 | 12/1993 | Miachon | 494/43 X |
| 5,387,342 | 2/1995 | Rogers et al. | |

FOREIGN PATENT DOCUMENTS

1398915A2  5/1988  U.S.S.R.

*Primary Examiner*—Charles E. Cooley
*Attorney, Agent, or Firm*—Blakely, Sokoloff, Taylor & Zafman

[57] ABSTRACT

A centrifugal separator includes a rotor sleeve which reduces the fine scale mixing of liquid components. The rotor sleeve in the annular mixing zone minimizes liquid-liquid shear, but does not adversely affect the pumping action of the rotor. The separator comprises a housing having a generally cylindrical inner surface defining an interior chamber. A hollow rotor is disposed within the chamber for rotation therein, the rotor having upper and lower openings and a generally cylindrical rotor wall with an inner and outer surface. The outer surface of the rotor wall is spaced apart from the inner surface of the housing and thereby defines the annular mixing zone. The rotor sleeve comprises a cylinder only slightly larger than the rotor. The sleeve is fixed relative to the housing, thereby preventing liquid within the annular mixing zone from contacting the rotating outer surface of the rotor. The reduction in mixing action dramatically increases the separation efficiency for shear-sensitive liquid mixtures.

3 Claims, 1 Drawing Sheet

ROTOR SLEEVE FOR A CENTRIFUGAL SEPARATOR

BACKGROUND OF THE INVENTION

1. Field of the Invention

This invention relates generally to centrifugal separators for separating mixed liquids of different densities, and more particularly to an improved separator assembly for limiting the mixing action of a mixed phase inlet stream.

2. Prior Art

Centrifugal devices are widely used for separating materials of different densities. Such devices have been found to provide a highly satisfactory method of separating liquids from one another based on different weight phases.

Separators, also referred to as extractors, can separate the individual components of a mixed component input stream, provided that the components remain in separate phases. In many instances, extraction may be facilitated with the use of a solvent that is injected into the device as a second input stream. In this case, the device is often referred to as a "contactor" since it brings the waste stream and the solvent stream into intimate contact. The solvent phase, together with the soluble specie(s), is then separated from the carrier phase by differentiation of the phase densities. Typically, the process liquids comprise a lighter (less dense) solvent or organic phase and a heavier aqueous phase, which are introduced into the centrifugal contactor through separate inlets that communicate with a mixing zone. The resulting liquid mixture then enters the rotor of the contactor where centrifugal force separates the heavier phase from the lighter phase by forcing the heavier phase to flow outwardly away from the rotational axis of the rotor and thereby displace the lighter phase closer to the rotational axis of the rotor. The two phases are then individually collected at the upper end of the rotor with the heavier phase exiting at a location adjacent to the outer periphery and the lighter phase exiting at a location adjacent to the rotational axis. Typically, one or both of the exiting phases is subjected to one or more subsequent stages of extraction such as by circulation through another contactor.

A method of centrifugally separating the components of a water-petroleum mixture is described in U.S. Pat. No. 4,959,158 issued to the first-named inventor of this application. The method described therein utilized a centrifugal contactor developed by the U.S. Department of Energy for the extraction of transuranic elements from radioactive waste streams at nuclear processing plants. It was discovered that this device could be advantageously employed for the separation of a water-petroleum mixture. Improvements to the basic contactor design are disclosed in co-pending application Ser. No. 08/522,520 filed Sep. 1, 1995 and commonly assigned with the present application.

SUMMARY OF THE INVENTION

The present invention provides a centrifugal separator which reduces the fine scale mixing of liquid components. A rotor shroud in the annular mixing zone minimizes liquid-liquid shear, but does not adversely affect the pumping action of the rotor. The separator comprises a housing having a generally cylindrical inner surface defining an interior chamber. A hollow rotor is disposed within the chamber for rotation therein, the rotor having upper and lower openings and a generally cylindrical rotor wall with an inner and outer surface. The outer surface of the rotor wall is spaced apart from the inner surface of the housing and thereby defines the annular mixing zone. The rotor shroud comprises a cylinder only slightly larger than the rotor. The shroud is fixed relative to the housing, thereby preventing liquid within the annular mixing zone from contacting the rotating outer surface of the rotor. The reduction in mixing action dramatically increases the separation efficiency for shear-sensitive liquid mixtures.

DETAILED DESCRIPTION OF THE INVENTION

Figure 1:
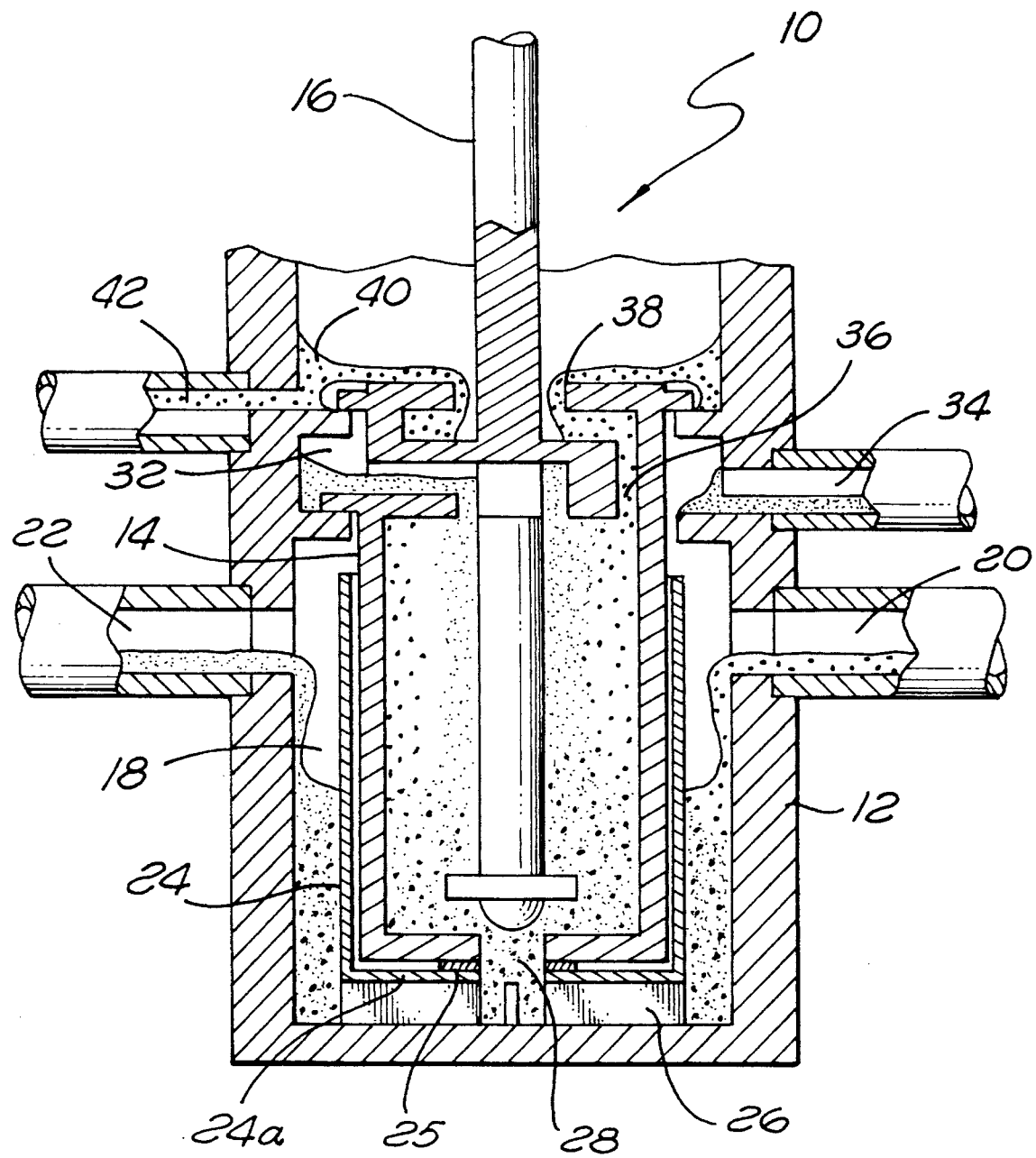
FIG. 1 is a cross-sectional view of a centrifugal separator constructed in accordance with the present invention.

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

FIG. 1 is a cross-sectional view of a separator 10 constructed in accordance with the present invention. It will be recognized that the general arrangement of the components is fairly typical for centrifugal separators known in the prior art. Therefore, details of the construction of the separator, apart from the particular subject matter of the present invention, will not be described herein at length.

The separator 10 comprises a housing 12 which is vertically oriented and defines a generally cylindrical volume which houses vertically oriented cylindrical rotor 14. Rotor 14 is mounted on shaft 16 which is rotated by a drive motor (not shown). A suspended rotor design is illustrated; however, it will be understood that shaft 16 could be further supported by a lower bearing in housing 12.

The outer diameter of rotor 14 is less than the inner diameter of housing 12, thereby defining an elongated annular chamber which provides a mixing zone 18 for the process liquids. The process liquids are admitted to annular mixing zone 18 through inlet ports 20 and 22. These may be used to admit separate components of a process or to admit a mixed phase for separation. As illustrated in FIG. 1, a heavier phase component is admitted through inlet port 20 and a lighter phase component is admitted through inlet port 22. In a conventional separator design, the process liquids are subjected to turbulent mixing action within annular mixing zone 18 since it is bounded by the stationary inner wall of housing 12 and the rotating outer wall of rotor 14. Such mixing action may be desirable for certain processes; however, it can adversely affect the separation efficiency in other processes.

Stokes' law of separation, for the particular case of a mixture of oil and water, may be stated as:

$$V_c = \frac{d^2(\rho_p - \rho_1)}{18\eta} r\omega^2$$

where:

$V_c$=centrifugal settling velocity d=droplet diameter $\rho_p$=water phase density $\rho_1$=oil phase density  $\eta$= water phase viscosity r=radius of separation vessel $\omega$=angular velocity The settling velocity of a dispersed liquid is a function of the square of the diameter of the droplet. Therefore, since the efficiency of separation is directly related to the settling velocity, it is important to avoid the creation of excessively small droplets. Thus, reduced mixing action within the annular mixing zone may be desirable. This is particularly true for separation of a mixed component stream such as oil and water.

In order to reduce the mixing action within annular mixing zone 18, the present invention provides an elongated sleeve or shroud 24 which surrounds rotor 14. The liquid within annular mixing zone 18 is thus shielded from the rotating outer surface of rotor 14. Shroud 24 preferably has a bottom wall 24a extending below the rotor, thereby fully encasing the lower portion of the rotor. This minimizes liquid-liquid shear and prevents further dispersion of the process liquids. Shroud 24 is fixed with respect to housing 12 and may be secured to the upper surfaces of radial vanes 26. An annular seal 25 between the bottom wall 24a of the shroud and the bottom of rotor 14 prevents the process liquids from entering the space separating the shroud from the rotor.

The mixed phase within annular mixing zone 18 migrates downward to the floor of housing 12. Radial vanes 26 are secured to the housing and direct the mixture through annual seal 25 and into rotor inlet 28. Once the mixture is admitted into the interior of the rotor, the centrifugal force of rotation forces the heavier phase outward against the wall of rotor 14 and displaces the lighter phase radially inwardly towards shaft 16. The lighter phase pours over weir 30 and is collected in channel 32 from which it exits at outlet port 34. The heavier phase continues through underflow channel 36, over weir 38 and into collector 40 from which it exits through outlet port 42.

The present invention was tested in a 10-inch diameter separator with a mixture of crude oil and water. The separator was operated at 1150 rpm for all tests. The test results are tabulated below:

| INPUT OIL CONCEN- TRATION | INPUT FLOWRATE (GPM) | SEPARATOR EFFLUENT ANALYTICAL RESULT | |
|---|---|---|---|
| WITHOUT SHROUD | | | |
| 15% | 16.5 | WATER: OIL: | 5% OIL 20% WATER |
| 30% | 15.5 | WATER: OIL: | 5% OIL 20% WATER |
| 50% | 14 | Emulsion formed and exited from both outlets | |
| WITH SHROUD | | | |
| 10% | 15 | WATER: OIL: | 1% OIL 1% WATER |
| 27% | 15 | WATER: OIL: | 1% OIL 5% WATER |
| 50% | 14 | WATER: OIL: | 3% OIL 2% WATER |
| 73% | 15 | WATER: OIL: | 5% OIL 2% WATER |
| 84% | 16 | WATER: OIL: | 5% OIL 2% WATER |

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A centrifugal separator comprising:

a housing having a generally cylindrical inner surface defining an interior chamber, said inner surface symmetrically disposed about an axis;

a hollow rotor disposed within said chamber for rotation about the axis, said rotor having upper and lower openings and a generally cylindrical rotor wall with an inner and an outer surface, said outer surface of the rotor wall spaced apart from the inner surface of the housing;

a generally cylindrical sleeve fixed to said housing, said sleeve being spaced apart from and surrounding said outer surface of the rotor wall, thereby defining an annular volume between the sleeve and the inner surface of the housing, wherein said lower opening in the rotor is in communication with the annular volume and wherein said sleeve includes a bottom wall having an aperture aligned with said lower opening in the rotor;

at least one inlet for introducing a liquid mixture having a density into the annular volume; and separation means disposed adjacent to the upper opening of the rotor for directing a first component of the liquid mixture having a density greater than the mixture's density to a first outlet and for directing a second component of the liquid mixture having a density less than the mixture's density to a second outlet.

2. The centrifugal separator of claim 1 further comprising a seal between said bottom wall of the sleeve and the rotor and surrounding said aperture so as to prevent said liquid mixture from intruding between the sleeve and the rotor.

3. The centrifugal separator of claim 1 wherein said housing includes a bottom surface having a plurality of upstanding generally radial vanes and wherein said bottom wall of the sleeve is attached to said vanes.

* * * * *